United States Patent
Bolda (10) Patent No.: US 6,985,342 B2
(45) Date of Patent: Jan. 10, 2006

(54) LINEARLY ADJUSTABLE LOGARITHMIC OUTPUT CURRENT SENSING RESISTANCE SYSTEM AND METHOD

(75) Inventor: Daniel J. Bolda, Menomonee Falls, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 143 days.

(21) Appl. No.: 10/641,600

(22) Filed: Aug. 15, 2003

(65) Prior Publication Data

US 2005/0036256 A1 Feb. 17, 2005

(51) Int. Cl.
H03H 1/00 (2006.01)

(52) U.S. Cl. ..................... 361/93.1; 323/367
(58) Field of Classification Search ................ 323/367; 361/93.1, 94, 97
See application file for complete search history.

(56) References Cited

U.S. PATENT DOCUMENTS 3,202,884 A * 8/1965 Bullock ...................... 361/198
3,327,171 A * 6/1967 Lipnitz et al. ................. 361/98
3,723,285 A * 3/1973 Daga et al. ............... 204/229.2
3,766,436 A * 10/1973 Zocholl ........................ 361/94
4,047,235 A * 9/1977 Davis .......................... 361/100
4,271,444 A * 6/1981 Howell ........................ 361/48
5,146,154 A * 9/1992 Lippmann et al. .......... 323/367
5,502,374 A * 3/1996 Cota ........................... 324/127

* cited by examiner

Primary Examiner—Ronald Leja
(74) Attorney, Agent, or Firm—Patrick S. Yoder; Alexander M. Gerasimow (57) ABSTRACT

A resistance network is provided for synthesizing a non-linear logarithmic response in the resistance of the network comprising a potentiometer from the change of the resistance of the potentiometer. The network additionally comprises a set of resistors. The potentiometer allows the resistance of the network to be varied, while the network manipulates the current in such a fashion that the input current required to produce a desired output voltage is a linear function of the resistance of the potentiometer. Incorporated into a current overload detection circuit, this allows an even spacing of the desired trip current settings about the dial of the potentiometer.

25 Claims, 5 Drawing Sheets

LINEARLY ADJUSTABLE LOGARITHMIC OUTPUT CURRENT SENSING RESISTANCE SYSTEM AND METHOD

BACKGROUND OF THE INVENTION

The present invention relates generally to circuitry for detecting current overloads from a voltage source to a load. In particular, the invention relates to a technique for allowing the precise setting of a trip current value by means of a resistance network.

In industrial settings, induction motors are often used to drive electric machinery. These motors are generally designed to operate within a certain range of current. Exceeding this current range can lead to excessive heat generation which can damage the motors. Overload relays are frequently utilized to prevent this damage from occurring. In these settings, overload relays measure the current entering the motor from the power supply. If a current overload is detected, the overload relay disconnects the motor from the power supply. The trip current for these relays is generally set by manually adjusting the resistance of an internal current overload detection circuit.

Frequently, such adjustment is facilitated by a potentiometer within the current overload detection circuit. Most often, a rotatable dial is used to set the trip current for the overload relay by varying the resistance of the potentiometer. The current and resistance of any circuit are inversely related. Thus, as the resistance of the potentiometer increases, the current decreases; and as the resistance of the potentiometer decreases, the current increases. However, the current and resistance of the circuit are reciprocally related, not linearly. As a result, while the resistance of the potentiometer changes linearly with the rotation of the dial, the corresponding trip current changes in a non-linear fashion. This relationship is governed by Ohm's Law, which states that the voltage across a resistor is equal to the current through the resistor multiplied by its resistance. Thus, in the case of a desired 10V burden voltage, trip current settings 1A, 2A, 3A, 4A, and 5A would require resistances of 10Ω, 5Ω, 3.3Ω, 2.5Ω, and 2Ω respectively. Thus, if a 10Ω potentiometer is used, a setting of 1A occurs at one end of the potentiometer's range (when set to 10Ω), but 2A operation occurs in the middle of the potentiometer's range at 5Ω. As a result, the higher the trip current needs to be set, the closer the markings must be to each other, leading to a crowding of the higher settings toward the opposite end of the potentiometer. Consequently, the dial angle between these higher current settings is quite small, which presents difficulties in precisely setting the trip current and increases the possibility of operator error damaging to the motor. In addition, the uneven spacing between settings is often simply inconvenient and non-intuitive for users.

In an attempt to overcome this crowding problem, custom potentiometers have been developed. These custom potentiometers are made so that the resistance varies non-linearly with respect to the rotation of the dial. A standard potentiometer is usually formed from one resistor and a sliding mechanism. The resistance of the resistor is consistent throughout, so that the resistance changes linearly according to the length of the resistive element from the point at which current is input to the point at which the slider makes contact with the resistor. Custom potentiometers incorporate a similar sliding mechanism, but the resistor utilized is non-linear. Such a custom potentiometer may be constructed of two resistors with different resistive properties; may incorporate a great number of resistive elements, each with different resistive characteristics; or may utilize a single resistive element with resistive properties that vary through the length of the element.

These custom potentiometers may reduce the problem of the crowding of higher current settings toward one end of a potentiometer, but there are shortcomings associated with the incorporation of such a custom potentiometer within an overload relay. One such drawback is the expense involved in using custom potentiometers. Custom potentiometers are much more difficult to manufacture than standard, linear potentiometers. The resistances have to be carefully selected and spliced together. As a result, they are more expensive than linear potentiometers. Additionally, these custom potentiometers are only partially effective in addressing the issue of uneven marking and crowding of settings. The simpler versions of custom potentiometers incorporate two different resistors spliced together. This only reduces the problem. As the slider moves across the resistors, the trip current being set still changes in a non-linear fashion. The current settings of the dial still experience some level of crowding, but the crowding is less severe and occurs at both one end of the potentiometer range and near the middle of its range as the slider nears the end of the first resistor. An even more expensive, three-resistance custom potentiometer would experience somewhat less crowding than the two-resistance version, but the crowding would occur at three locations of the potentiometer's range instead of two.

Clearly, there is a need for an overload relay with dial markings that are evenly spaced about the dial. Such an arrangement would allow for more precise setting of a trip current for an overload relay, reducing the risk that human error would result in expensive damage to complex machinery. There is a particular need for an overload relay that can fulfill these objectives through the use of a simple, linear potentiometer.

SUMMARY OF THE INVENTION

The present technique provides a novel technique for synthesizing a non-linear logarithmic response in the resistance of a resistance network to changes in the resistance provided by a potentiometer incorporated in the network. The technique is applicable to a wide range of equipment, but is particularly well suited to current overload detection circuits.

In accordance with a first aspect of the technique, a method for synthesizing a non-linear logarithmic response in the resistance of a resistance network to changes in the resistance provided by a potentiometer is provided. The method includes inputting a current into the resistance network comprising the potentiometer and manipulating the flow of current through the resistance network by varying the resistance of the potentiometer. Changes in the resistance of the potentiometer alter the rate at which current passes through other elements of the network. A current is then output from the resistance network, wherein the current output approximates a linear function of the resistance of the potentiometer.

In accordance with another aspect of the technique, a resistance network comprising a plurality of resistors, including at least one potentiometer, is provided. The resistance network is configured to synthesize a non-linear logarithmic response in the resistance of the network to changes in the resistance provided by the potentiometer. This resistance network is employed in an exemplary embodiment of the technique provided in the form of a current overload detection circuit. The circuit is further comprised of a protection circuit, a sensing network, and a trip circuit. The response obtained by use of the present technique allows the trip current settings to be evenly spaced about a dial used to set the desired trip current.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
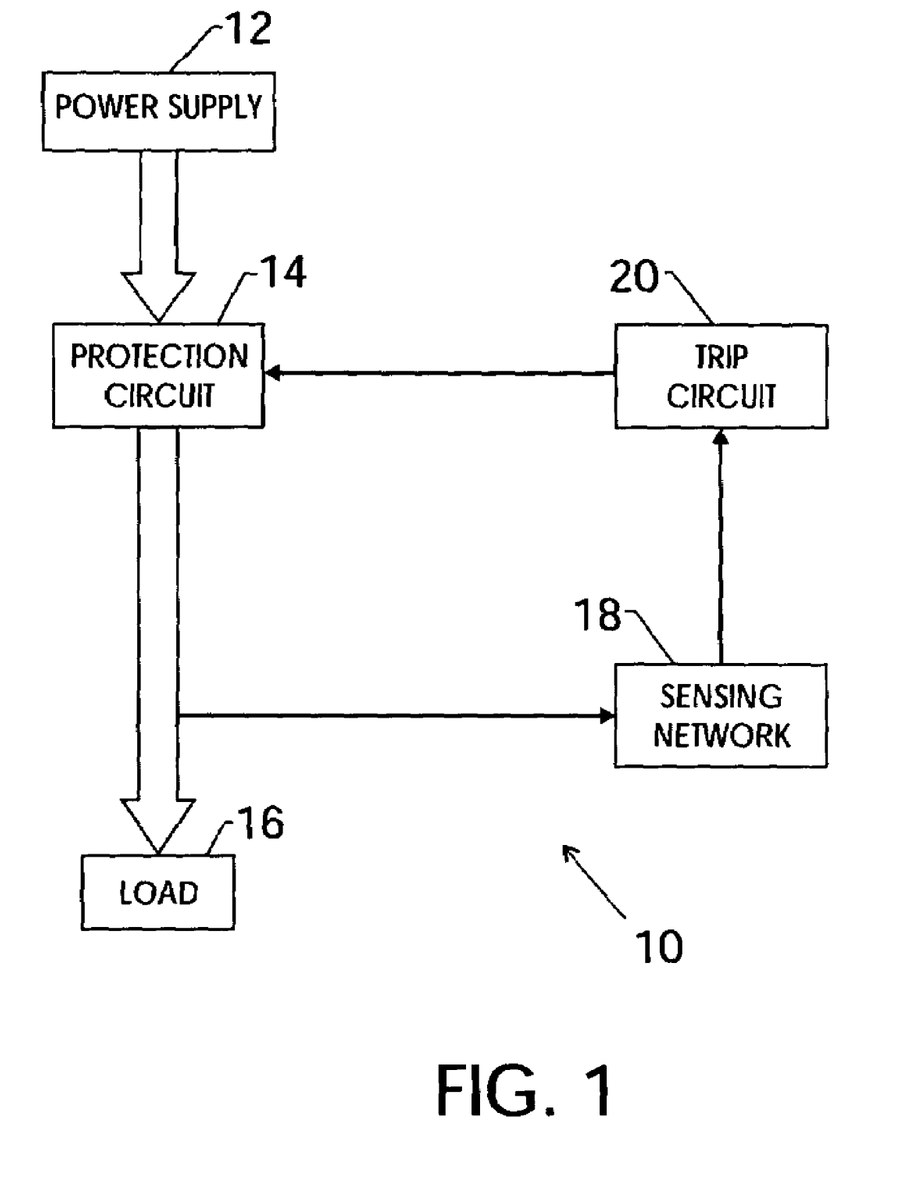
FIG. 1 is a general schematic of a typical system for detecting current overloads and disconnecting power from a motor in such an occurrence.

Turning now to the drawings, and referring first to FIG. 1, a current overload detection circuit is illustrated for controlling a load, such as an electric motor, the overall system being designated generally by the reference numeral 10. System 10 includes an overload protection circuit comprising a power supply 18, and a protection circuit 20. A load 16 is powered by the system, and current to the load is sensed by a sensing network 18. The sensing network 18 is, in turn, coupled to a trip circuit 20 that causes the overload protection circuit to remove power to the load in the event of certain fault conditions, such as an overcurrent condition. As will be appreciated by those skilled in the art, in a typical application, the protection circuit may be in the form of a contactor, while the sensing network and the trip circuit may comprise an overload relay. In a motor drive application, the overload relay and the protection circuit may generally form a motor starter.

When operating desirably, power supply 12 provides sufficient power to drive load 16. Protection circuit 14 is provided between power supply 12 and load 16 and electrically disconnects power supply 12 and load 16 upon the occurrence of an overload of current. Sensing network 18 and trip circuit 20 are provided to add functionality to protection circuit 14. Sensing network 18 and trip circuit 20 are used to determine whether the current being provided to load 16 from power supply 12 is greater than desired. In such a case, trip circuit 20 triggers protection circuit 14, thereby electrically disconnecting load 16 from power supply 12.

Figure 2:
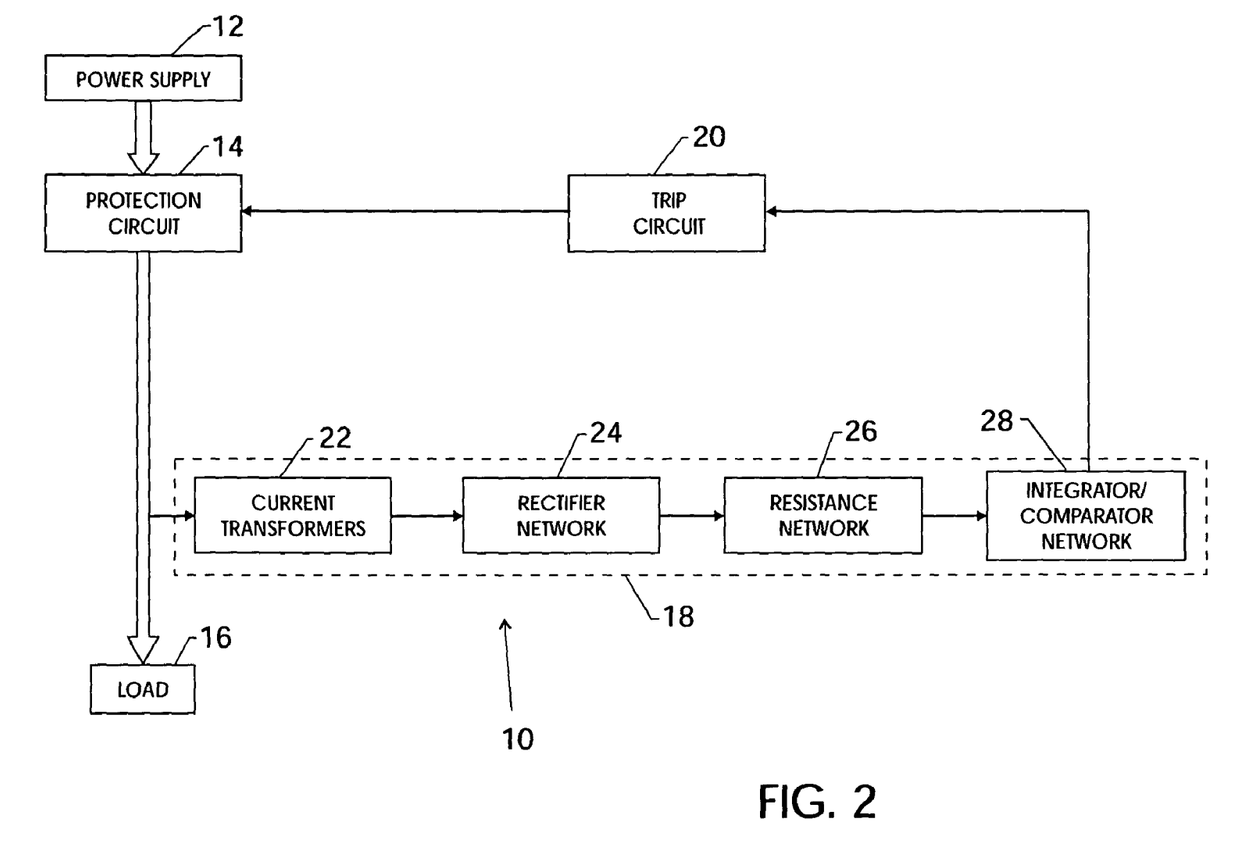
FIG. 2 is a general schematic of certain functional components of an exemplary current overload detection circuit in accordance with the present technique.

A more detailed representation of the sensing network 18 is illustrated as part of system 10 in FIG. 2. As in the previous figure, system 10 comprises power supply 12, protection circuit 14, load 16, sensing network 18, and trip circuit 20. Sensing network 18 is shown in this figure to be comprised of one or more current transformers 22, a rectifier network 24, a resistance network 26, and an integrator/comparator network 28. The current running from power supply 12 to load 16 generates a sympathetic AC current in current transformers 22. The current provided by current transformers 22 is proportional to that flowing from power supply 12 to load 16.

Rectifier network 24 is coupled to current transformers 22 and converts the AC current input from current transformers 22 into a proportional DC current. This DC current is input to resistance network 26. Current may be manipulated within resistance network 26 by varying the resistance. Integrator/comparator network 28 receives the signal output from resistance network 26. Integrator/comparator network 28 produces a voltage signal representative of the current flowing from power supply 12 to load 16 and compares it to a predetermined reference voltage equivalent to the actual voltage required to trip the circuit. If the representative voltage signal exceeds the reference voltage, trip circuit 20 triggers protection circuit 14, thereby electrically disconnecting load 16 from power supply 12.

Figure 3:
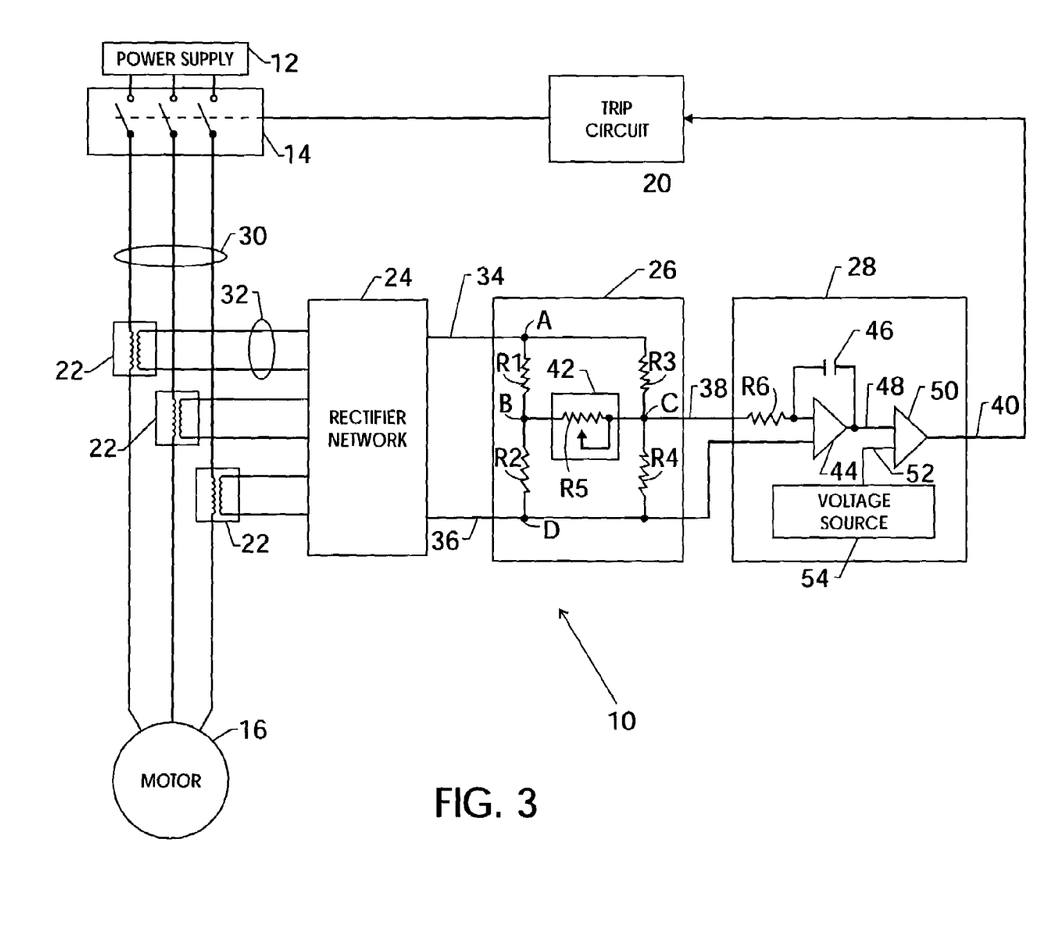
FIG. 3 is a detailed schematic of an exemplary current overload detection circuit in accordance with the present technique.

One specific embodiment is illustrated in FIG. 3. In this embodiment, power supply 12 provides the power to drive motor 16 via power conductors 30. This driving power passes through overload relay 14 which may be used to disconnect motor 16 from power supply 12. Current transformers 22 generate an AC current proportional to the current flowing to motor 16. This AC current generated by current transformers 22 is input through sensed signal conductors 32 to rectifier network 24, which converts the current to a proportional DC current. This current then passes to resistance network 26 via inputs 34 and 36.

In the present embodiment, resistance network 26 comprises static resistors R1, R2, R3, and R4; and a potentiometer 42 configured to provide a dynamic resistance via resistor R5. Nodes A, B, C, and D are provided in the diagram solely for ease of reference and do not constitute any physical aspect of resistance network 26. Resistors R1 and R2 are shown in series, parallel with the series of resistors R3 and R4, between node A and node D. Potentiometer 42 bridges the two parallel series between node B and node C. Such an arrangement may be referred to as a resistive H-network, due to the configuration of the resistances defined in the illustrated schematic. As can be seen in the present figure, the upper legs comprising resistors R1 and R3 are connected together, as are the lower legs comprising resistors R2 and R4.

Current input to resistance network 26 flows through resistors R1, R2, R3, R4, and R5. The amount of current that flows through each resistor may be manipulated by varying the resistance of potentiometer 42. Potentiometer 42 diverts current to the various legs of the H-network configuration and resistors R1, R2, R3, and R4. Resistor R5 of potentiometer 42 may be a single, linear resistive element. In such a case, the resistance provided by potentiometer 42 varies linearly with the length of the resistive element of resistor R5 through which a current is passing. While the resistance of such a potentiometer varies linearly, the overall resistance of the resistance network varies at a non-linear rate due to the inclusion of additional resistors R1, R2, R3, and R4. By carefully selecting these additional resistances, a logarithmic response can be obtained by which the current output by resistance network 26 varies linearly with respect to the resistance of potentiometer 42. Consequently, a linear relationship between the trip current settings and the potentiometer resistance also results. This permits an even spacing of the trip current settings about a dial that controls the resistance of potentiometer 42, as explained further below in regards to FIG. 7.

Resistance network 26 outputs a burden voltage 38, which is then input into integrator/comparator network 28. Integration of the signal is achieved through use of amplifier 44 with feedback capacitor 46 and input resistor R6. As will be understood by one skilled in the art, the circuit comprising amplifier 44, capacitor 46, and resistor R6, inverts the signal with some scaling and outputs a representative voltage signal 48, the reaction time of amplifier 44 being proportional to the burden voltage 38. The representative voltage signal 48 is then input to comparator 50. Representative voltage signal 48 is compared to a reference voltage 52 generated by reference voltage source 54. Comparator 50 produces an output signal 40 that is input into trip circuit 20. If representative voltage signal 48 exceeds reference voltage 52, trip circuit 20 disconnects motor 16 from power supply 12 by way of overload relay 14. Otherwise, the power is uninterrupted and the motor continues operation.

Figure 4:
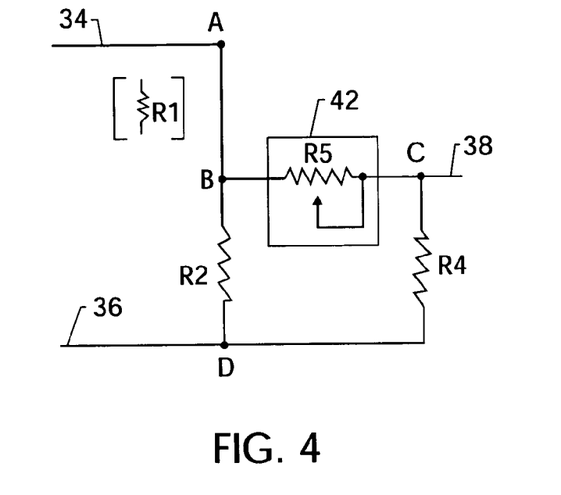
FIG. 4 is an alternative embodiment of the resistance network incorporated in the present technique.

Another embodiment of resistance network 26 is shown in FIG. 4. In this embodiment, resistance network 26 is shown comprising a potentiometer 42 with a dynamic resistance provided by resistor R5 and two static resistors R2 and R4. This configuration may be referred to as an h-network configuration. As in the previous figure, current is input to resistance network 26 from rectifier network 24 (See FIG. 3) via inputs 34 and 36. Similarly, resistor R2 is coupled between nodes B and D, while resistor R4 is coupled between nodes C and D. Potentiometer 42, and therefore resistor R5, is coupled between nodes B and C. Burden voltage 38 is output from the resistance network to integrator/comparator network 28 (See FIG. 3). Similar to the H-network configuration of the last figure, current is directed through resistors R2 and R4 in varying amounts dependent upon the resistance setting of potentiometer 42. The result is an overall resistance of resistance network 26 that varies logarithmically with respect to the rate at which the resistance of potentiometer 42 is adjusted. By carefully selecting resistors R2 and R4, a logarithmic response can be obtained by which the current output of resistance network 26 varies in a nearly linear fashion with the resistance of potentiometer 42.

It should be noted that, in fact, several configurations for the resistance network are presently envisioned. In a simple implementation, only resistors R2 and R4 are provided, in addition to the potentiometer, as shown in FIG. 4. In this configuration, quite linear spacing between dial indications may be provided, as summarized below. In an intermediate implementation, resistor R1 may be provided, as shown by the bracketed inset in FIG. 4, with R3 being omitted from the configuration of FIG. 3. Indeed, the configuration of FIG. 4 may be considered a special case of an arrangement that includes resistors R1, R2 and R4, but where R1 is effectively a shunt trace, having a zero Ω resistance value. The configuration of FIG. 3 may provide the most closely logarithmic mapping of linear dial movements, while the other configurations may be preferred from cost and ease of manufacturing standpoints.

Figure 5:
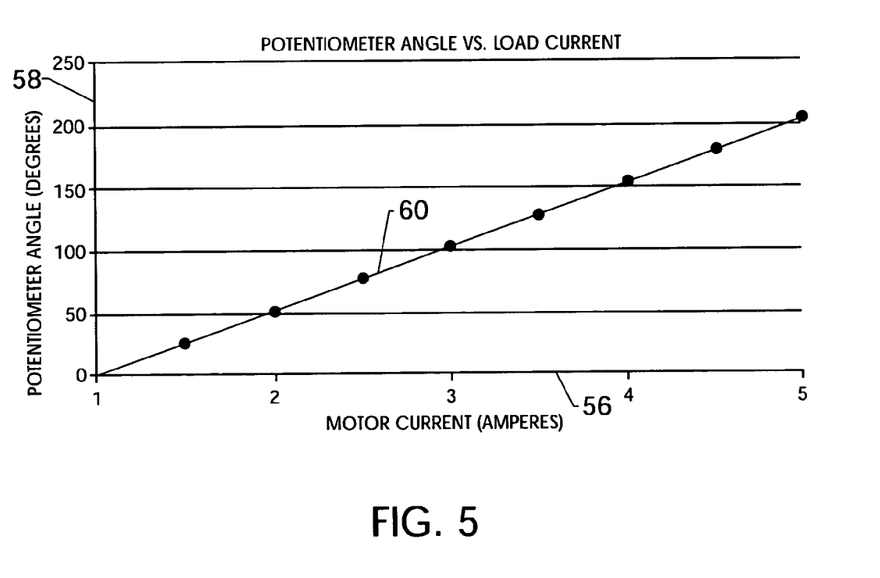
FIG. 5 is a graphical representation of the linear relationship between the resistance of the potentiometer and the output current that may be achieved through the present technique.

The virtual linearity of this configuration is demonstrated in FIG. 5. As one skilled in the art would recognize, the values incorporated herein are merely included as means for illustration. The present technique is in no way limited to the specific values enumerated in this description and in fact may be practiced with a great many different values. In the present figure, a graph illustrating the relationship between the desired maximum motor current and the angle of the potentiometer dial (which is directly linear with the resistance setting of potentiometer 42). The present data is based upon an overload relay configured to protect a motor operating somewhere between 1A and 5A with resistor R2 providing a resistance of 590Ω, a resistor R4 providing a resistance of 3394Ω, and potentiometer 42 providing resistance within a range of 0Ω to 20,000Ω by resistor R5. The motor current is shown along horizontal axis 56, while the potentiometer angle is shown along vertical axis 58. Trace 60 is a best-fit line for the data points represented on the graph. Based on these resistance values, the potentiometer angle required for setting the trip current of the overload relay is as follows:

| Motor Current Setting (Amps) | Approx. Pot Angle (degrees from base position) | Incremental Change in Pot Angle (degrees) |
| --- | --- | --- |
| 1 | 0 (nominal) | |
| 1.5 | 26 | 26 |
| 2 | 51 | 25 |
| 2.5 | 77 | 26 |
| 3 | 102 | 25 |
| 3.5 | 127 | 25 |
| 4 | 154 | 27 |
| 4.5 | 179 | 25 |
| 5 | 204 | 25 |

These data points are shown on the graph of FIG. 5. As can be seen by this data and the corresponding graph, resistance network 26 synthesizes a generally linear trip current response to the variation of the resistance of potentiometer 42. As stated, this result is indicative of resistance network 26 described above with respect to FIG. 4. The full H-network configuration taught in the description of FIG. 3, with the addition of resistors R1 and R3, is capable of producing an even truer linear response, albeit at a higher production cost, than that obtained with the modified H-network configuration lacking these elements.

Figure 6:
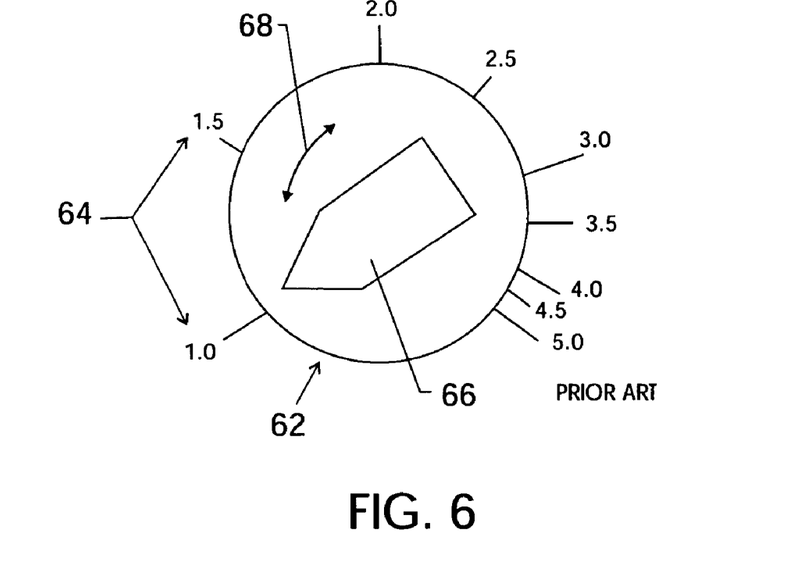
FIG. 6 shows a prior art overload relay dial with typical markings for setting a trip current.
Figure 7:
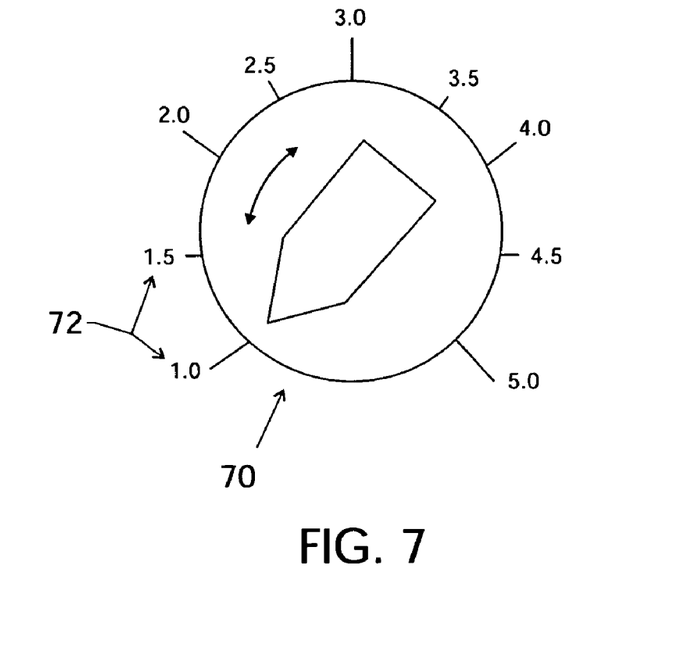
FIG. 7 shows an overload relay dial with markings consistent with the present technique.

A typical dial for a potentiometer is shown in FIGS. 6 and 7. FIG. 6 shows a dial 62 with various settings 64 typical of a linear potentiometer incorporated in a current overload detection circuit 10. A particular trip current setting 64 may be achieved by rotating dial 62 to the point at which indicator 66 is aligned with the desired setting. As can be seen in the figure, the angle required to move from a lower setting to a higher setting becomes exponentially smaller. Thus, it becomes increasingly difficult to set a desired trip current as the current nears the maximum range of current overload detection circuit 10.

Shown in FIG. 7 is a dial 70 for a potentiometer of an exemplary current overload detection circuit 10 configured to use the present technique. Dial 70 may be used to set the trip current of current overload detection circuit 10 by turning indicator 66. Unlike dial 62 of FIG. 6, however, dial 70 has generally linear markings 72 placed at evenly spaced intervals around the face of dial 70. This configuration of markings 72 is made possible by use of a resistance network as disclosed herein. The even spacing allows more accurate setting of higher desired trip currents, thus minimizing the effects of human error and offering greater protection to the machinery incorporating current overload detection circuit 10.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A current sensing resistance circuit comprising a plurality of resistors, wherein the plurality of resistors comprise a potentiometer and an H-network configuration, and the resistance circuit is configured to synthesize a non-linear logarithmic response in the resistance of the circuit to changes in the resistance provided by the potentiometer.

2. The circuit of claim 1, wherein the resistance circuit is further configured to synthesize a generally linear response in output current to changes in the resistance provided by the potentiometer.

3. The circuit of claim 1, wherein the plurality of resistors comprise a linear potentiometer.

4. A current overload detection circuit comprising:
a protection circuit configured to interrupt current to a load;
a sensing network having first and second output nodes and configured to sense current to the load;
a trip circuit coupled to the protection circuit and configured to cause interruption of current to the load via the protection circuit; and
a resistance network coupled between the sensing network and the trip circuit, the resistance network comprising a first resistance coupled between the first output node of the sensing network and a junction node, a second fixed resistance coupled between the first output node of the sensing network and an output node of the resistance network, a third fixed resistance coupled between the second output node of the sensing network and the junction node, and an adjustable resistance coupled between the junction node and the output node of the resistance network, wherein values of the first and second fixed resistances and of the adjustable resistance are selected to provide for substantially logarithmic adjustment of an input current from the output nodes of the sensing network at which a desired output voltage is produced at the output node of the resistance network, and the substantially logarithmic adjustment is mapped by substantially linearly regularly spaced indicator markings of the adjustable resistance.

5. The circuit of claim 4, the sensing network further comprising a comparison circuit coupled to the output node of the resistance network for comparing the output voltage at the output node of the resistance network to a predetermined voltage.

6. The circuit of claim 4, further comprising a fourth fixed resistance coupled between the second output node of the sensing network and the output node of the resistance network.

7. The circuit of claim 4, the sensing network comprising a rectifier for converting an alternating current input to a direct current output at the output nodes of the sensing network.

8. The circuit of claim 7, wherein the sensing network includes a series of current transformers for sensing current through a plurality of conductors and for applying the sensed current to the rectifier.

9. A current detection circuit comprising:
a sensing network having first and second output nodes; and
a resistance network comprising a first resistance coupled between the first output node of the sensing network and a junction node, a second fixed resistance coupled between the first output node of the sensing network and an output node of the resistance network, a third fixed resistance coupled between the second output node of the sensing network and the junction node, and an adjustable resistance coupled between the junction node and the output node of the resistance network.

10. The circuit of claim 9, wherein values of the first and second fixed resistances and of the adjustable resistance are selected to provide for substantially logarithmic adjustment of an input current from the output nodes of the sensing network at which a desired output voltage is produced at the output node of the resistance network.

11. The circuit of claim 10, wherein the substantially logarithmic adjustment is mapped by substantially linearly regularly spaced indicator markings of the adjustable resistance.

12. The circuit of claim 9, further comprising a fourth fixed resistance coupled between the second output node of the sensing network and the output node of the resistance network.

13. The circuit of claim 9, the sensing network comprising a rectifier for converting an alternating current input to a direct current output at the output nodes of the sensing network.

14. The circuit of claim 13, wherein the sensing network includes a series of current transformers for sensing current through a plurality of conductors and for applying the sensed current to the rectifier.

15. A current detection circuit comprising:
a sensing network having first and second output nodes; and
a resistance network comprising a first resistance coupled between the first output node of the sensing network and a junction node, a second fixed resistance coupled between the first output node of the sensing network and an output node of the resistance network, a third fixed resistance coupled between the second output node of the sensing network and the junction node, and an adjustable resistance coupled between the junction node and the output node of the resistance network, wherein values of the first and second fixed resistances and of the adjustable resistance are selected to provide for substantially logarithmic adjustment of an input current from the output nodes of the sensing network at which a desired output voltage is produced at the output node of the resistance network, and the substantially logarithmic adjustment is mapped by substantially linearly regularly spaced indicator markings of the adjustable resistance.

16. The circuit of claim 15, further comprising a fourth fixed resistance coupled between the second output node of the sensing network and the output node of the resistance network.

17. The circuit of claim 15, the sensing network comprising a rectifier for converting an alternating current input to a direct current output at the output nodes of the sensing network.

18. The circuit of claim 15, wherein the sensing network includes a series of current transformers for sensing current through a plurality of conductors and for applying the sensed current to the rectifier.

19. A current detection circuit comprising:
a resistance network comprising a first resistance configured to be coupled between a first output node of a sensing network and a junction node, a second fixed resistance configured to be coupled between a second output node of the sensing network and an output node of the resistance network, a third fixed resistance configured to be coupled between the second output node of the sensing network and the junction node, and an adjustable resistance coupled between the junction node and the output node of the resistance network, wherein values of the first and second fixed resistances and of the adjustable resistance are selected to provide for substantially logarithmic adjustment of an input current from the output nodes of the sensing network at which a desired output voltage is produced at the output node of the resistance network, and the substantially logarithmic adjustment is mapped by substantially linearly regularly spaced indicator markings of the adjustable resistance.

20. The circuit of claim 19, further comprising a fourth fixed resistance configured to be coupled between the second output node of the sensing network and the output node of the resistance network.

21. A method for synthesizing a non-linear logarithmic response in the resistance of a resistance network to changes in the resistance provided by a potentiometer comprising:

inputting a current into the resistance network comprising a plurality of resistors and the potentiometer, the plurality of resistors comprising an h-network configuration;

manipulating the flow of current through the resistance network by varying the resistance of the potentiometer; and outputting a current from the resistance network, wherein the current output approximates a linear function of the resistance of the potentiometer.

22. The method of claim 21, wherein the potentiometer is a linear potentiometer.

23. A current sensing resistance circuit comprising a plurality of resistors, wherein the plurality of resistors comprise a potentiometer and an h-network configuration, and the resistance circuit is configured to synthesize a non-linear logarithmic response in the resistance of the circuit to changes in the resistance provided by the potentiometer.

24. The circuit of claim 23, wherein the resistance circuit is further configured to synthesize a generally linear response in output current to changes in the resistance provided by the potentiometer.

25. The circuit of claim 23, wherein the plurality of resistors comprise a linear potentiometer.

* * * * *